United States Patent
Li et al.

(10) Patent No.: US 10,764,425 B2
(45) Date of Patent: Sep. 1, 2020

(54) METHOD AND APPARATUS FOR DETECTING STATE

(71) Applicant: BEIJING XIAOMI MOBILE SOFTWARE CO., LTD., Beijing (CN)

(72) Inventors: Guosheng Li, Beijing (CN); Yinghong Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 25 days.

(21) Appl. No.: 16/102,359

(22) Filed: Aug. 13, 2018

(65) Prior Publication Data
US 2019/0089828 A1    Mar. 21, 2019

(30) Foreign Application Priority Data

Sep. 19, 2017 (CN) .......................... 2017 1 0846306

(51) Int. Cl.
| H04M 1/725 | (2006.01) |
| H04W 52/02 | (2009.01) |
| G06K 9/62 | (2006.01) |
| H04W 64/00 | (2009.01) |

(52) U.S. Cl.
CPC ...... *H04M 1/72569* (2013.01); *G06K 9/6267* (2013.01); *H04W 52/0225* (2013.01); *H04W 52/0254* (2013.01); *H04W 52/0258* (2013.01); *H04M 2250/12* (2013.01); *H04W 64/006* (2013.01)

(58) Field of Classification Search
None
See application file for complete search history.

(56) References Cited

U.S. PATENT DOCUMENTS

| 2007/0099574 A1 | 5/2007 | Wang |
| 2012/0071149 A1 | 3/2012 | Bandyopadhyay et al. |

(Continued)

FOREIGN PATENT DOCUMENTS

| CN | 105023022 A | 11/2015 |
| CN | 105913010 A | 8/2016 |

(Continued)

OTHER PUBLICATIONS

Search report and Written Opinion in corresponding PCT Application No. CN2018071626, dated May 30, 2018, 10 pages.

(Continued)

*Primary Examiner* — Jason E Mattis
*Assistant Examiner* — Bao G Nguyen
(74) *Attorney, Agent, or Firm* — Arch & Lake LLP

(57) ABSTRACT

A method, an apparatus, and a storage medium are provided for detecting a state in the field of mobile technology. The method may include: acquiring a state sample set of a plurality of sample mobile terminals, determining a classification algorithm; acquiring a classifier by training the state sample set determined as training data according to the classification algorithm; and sending the classifier to a mobile terminal to be detected, in which the mobile terminal to be detected is configured to determine whether the mobile terminal to be detected is located in in a holding space similar to the preset holding space based on the classifier and according to a state sample of the mobile terminal to be detected.

18 Claims, 9 Drawing Sheets

(56) References Cited

U.S. PATENT DOCUMENTS

| | | | | |
|---|---|---|---|---|
| 2012/0224677 A1* | 9/2012 | Riley | ............... | H04L 12/1407 |
| | | | | 379/93.01 |
| 2012/0254809 A1 | 10/2012 | Yang et al. | | |
| 2014/0025973 A1* | 1/2014 | Schillings | ............... | H04Q 9/00 |
| | | | | 713/323 |
| 2015/0094087 A1 | 4/2015 | Chen | | |
| 2016/0302155 A1 | 10/2016 | Nilsson | | |
| 2018/0124233 A1* | 5/2018 | Abramson | ............... | G06F 3/017 |

FOREIGN PATENT DOCUMENTS

| | | |
|---|---|---|
| CN | 107016346 A | 8/2017 |
| CN | 107169525 A | 9/2017 |
| CN | 107169534 A | 9/2017 |
| KR | 20150038141 A | 4/2015 |
| WO | 2014162316 A2 | 10/2014 |
| WO | 2015150869 A1 | 10/2015 |

OTHER PUBLICATIONS

Extended European search report issued in corresponding European Application No. 18191000.1, dated Mar. 13, 2019, 9 pages.
First Office Action issued to Korean Patent Application No. 10-2019-706442 dated Feb. 17, 2020 with English ranslation, (18p).

* cited by examiner

METHOD AND APPARATUS FOR DETECTING STATE

CROSS-REFERENCE TO RELATED APPLICATIONS

This application is a US national phase application of a Chinese Patent Application 201710846306.2, filed on Sep. 19, 2017, the entire contents of which are incorporated herein by reference.

TECHNICAL FIELD

The present disclosure generally relates to a field of mobile technology, and more particularly, to a method and an apparatus for detecting a state and a storage medium.

BACKGROUND

At present, a mobile terminal may determine whether the mobile terminal is in a pocket using various methods, and perform corresponding operations according to the determined result. For example, after the mobile terminal determines that the mobile terminal is in the pocket, the mobile terminal may enter a dormant mode automatically.

In related arts, there is a state detecting method for detecting whether a mobile terminal configured with a distance sensor (also called as proximity sensor or p-sensor) and an acceleration sensor (also called as g-sensor) is in a pocket. In this method, the mobile terminal may use the distance sensor to determine whether there is an obstacle in a certain direction, and use the acceleration sensor to acquire an acceleration of the mobile terminal. If there is an obstacle in a certain direction for the mobile terminal and the mobile terminal has an acceleration, it may be determined that the mobile terminal is in a pocket.

In a process of implementing the state detecting method, there are at least two problems existing in the related arts. In some specific scenes, the accuracy of the above method is low. For example, when the mobile terminal is in a moving vehicle (the mobile terminal always has an acceleration due to motion of the vehicle), and when the distance sensor of the mobile terminal is covered, the mobile terminal may determine that the mobile terminal is in a pocket.

SUMMARY

Embodiments of the present disclosure provide a method and an apparatus for detecting a state and a storage medium. The technical solution will be described as follows.

According to a first aspect of the present disclosure, a method for detecting a state is provided. The method includes: acquiring a state sample set of a plurality of sample mobile terminals, in which the state sample set includes n holding state samples collected by the plurality of sample mobile terminals when the plurality of sample mobile terminals are located in a preset holding space, and m non-holding state samples collected by the plurality of sample mobile terminals when the plurality of sample mobile terminals are not located in the preset holding space, where n and m are integers greater than zero; determining a classification algorithm; acquiring a classifier by training the state sample set determined as training data according to the classification algorithm; and sending the classifier to a target mobile terminal, in which the target mobile terminal is configured to determine whether the target mobile terminal is located in a holding space similar to the preset holding space based on the classifier and according to a target state sample of the target mobile terminal to be detected.

According to a second aspect of the present disclosure, a method for detecting a state is provided. The method includes: receiving a classifier sent by a classifier generating device, in which the classifier is acquired by training a state sample set determined as training data by the classifier generating device according to a classification algorithm and is configured to determine whether a mobile terminal to be detected is located in a holding space, the state sample set includes n holding state samples collected when a sample mobile terminal is located in the holding space, and m non-holding state samples collected when the sample mobile terminal is not located in the holding space, where n and m are integers greater than zero; acquiring a state sample of the mobile terminal to be detected at current time; inputting the state sample into the classifier; and acquiring a label outputted by the classifier according to the state sample of the mobile terminal to be detected at current time, in which the label is configured to indicate a category of the state sample, and the category of the state sample is one of a category of locating in the holding space and a category of not locating in the holding space.

According to a third aspect of the present disclosure, an apparatus for detecting a state is provided. The apparatus includes at least one processor configured to: acquire a state sample set of a plurality of sample mobile terminals, in which the state sample set includes n holding state samples collected by the plurality of sample mobile terminals when the plurality of sample mobile terminals are located in a preset holding space, and m non-holding state samples collected by the plurality of sample mobile terminals when the plurality of sample mobile terminals are not located in the preset holding space, where n and m are integers greater than zero; determine a classification algorithm; acquire a classifier by training the state sample set determined as training data according to the classification algorithm; send the classifier to a target mobile terminal, in which the target mobile terminal is configured to determine whether the target mobile terminal is located in a holding space similar to the preset holding space based on the classifier and according to a state sample of the target mobile terminal.

According to a fourth aspect of the present disclosure, an apparatus for detecting a state is provided. The apparatus includes: a receiver, configured to receive a classifier sent by a classifier generating device, in which the classifier is acquired by training a state sample set determined as training data by the classifier generating device according to a classification algorithm and is configured to determine whether a mobile terminal to be detected is located in a holding space, the state sample set includes n holding state samples collected when a sample mobile terminal is located in the holding space, and m non-holding state samples collected when the sample mobile terminal is not located in the holding space, where n and m are integers greater than zero; a sample acquiring module, configured to acquire a state sample of the mobile terminal to be detected at current time; an inputting module, configured to input the state sample into the classifier; and a label acquiring module, configured to acquire a label outputted by the classifier according to the state sample of the mobile terminal to be detected at current time, in which the label is configured to indicate a category of the state sample, and the category of the state sample is one of a category of locating in the holding space and a category of not locating in the holding space.

According to a fifth aspect of the present disclosure, a device for detecting a state is provided. The device includes: a processor; and a memory configured to store an instruction executable by the processor; in which the processor is configured to perform the method for detecting a state according to the first aspect.

According to a sixth aspect of the present disclosure, a device for detecting a state is provided. The device includes: a processor; and a memory configured to store an instruction executable by the processor; in which the processor is configured to perform the method for detecting a state according to the second aspect.

According to a seventh aspect of the present disclosure, a computer-readable storage medium is provided, in which instructions are stored in the computer-readable storage medium, when the instructions are executed by a processor, the method for detecting a state according to the first aspect is performed.

According to an eighth aspect of the present disclosure, a computer-readable storage medium is provided, in which instructions are stored in the computer-readable storage medium, when the instructions are executed by a processor, the method for detecting a state according to the second aspect is performed.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

Embodiments of the present disclosure are illustrated in the above accompany drawings and will be described in further detail hereinafter. These accompany drawings and literal description are not intended to limit the scope of the idea of the present disclosure, but to explain the principle of the present disclosure with reference to particular embodiments for those skilled in the art.

DETAILED DESCRIPTION

In order to make the objects, technical solutions and advantages of embodiments of the present invention more clearly, implementations of the present disclosure are described in detail below with reference to the drawings.

Figure 1:
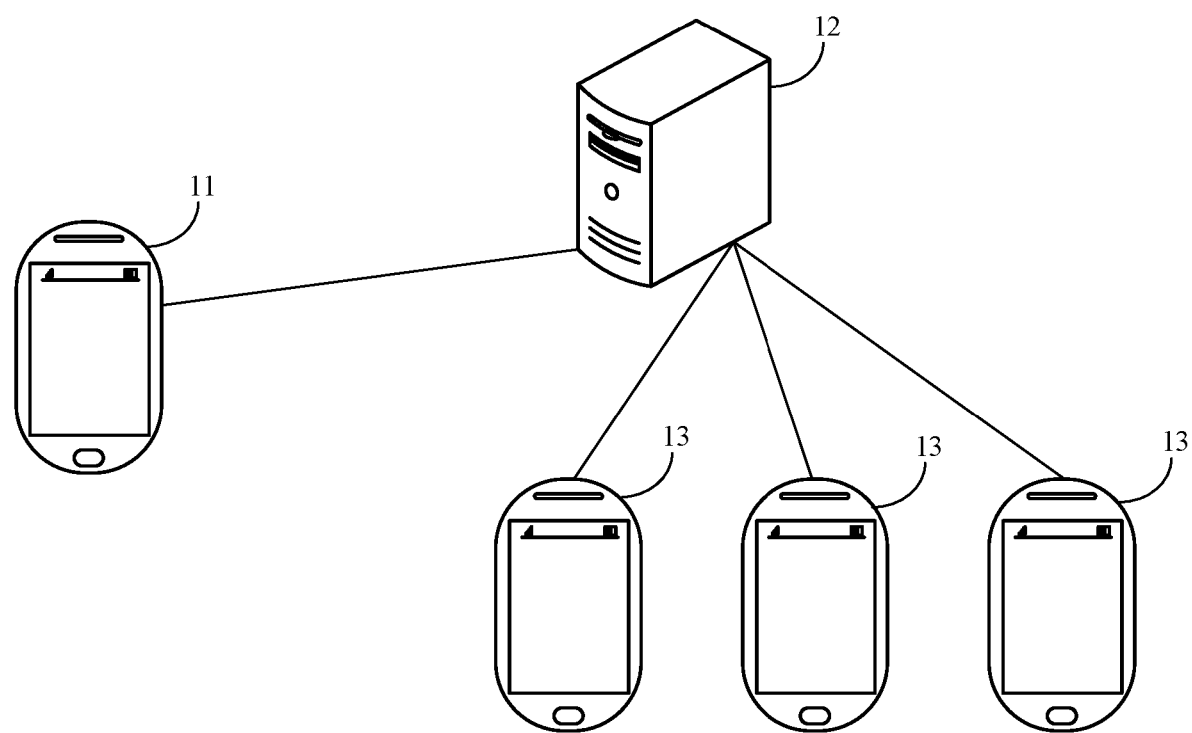
FIG. 1 is a schematic diagram illustrating an implementation environment related to aspects of the present disclosure.

FIG. 1 is a schematic diagram illustrating an implementation environment related to aspects of the present disclosure. A mobile terminal 11 to be detected, a classifier generating device 12 and a plurality of sample mobile terminals 13 are included in the implementation environment.

The mobile terminal 11 to be detected may be a mobile phone, a tablet, a handheld game console and various smart wearable devices.

The classifier generating device 12 may be a desktop computer, a laptop computer, a server or a server cluster. The classifier generating device 12 is able to establish a connection with the mobile terminal 11 to be detected and the plurality of sample mobile terminals 13 via a wired or wireless connection. The plurality of sample mobile terminals 13 may be a plurality of mobile terminals each having the same category or model number as the mobile terminal 11 to be detected.

Figure 2A:
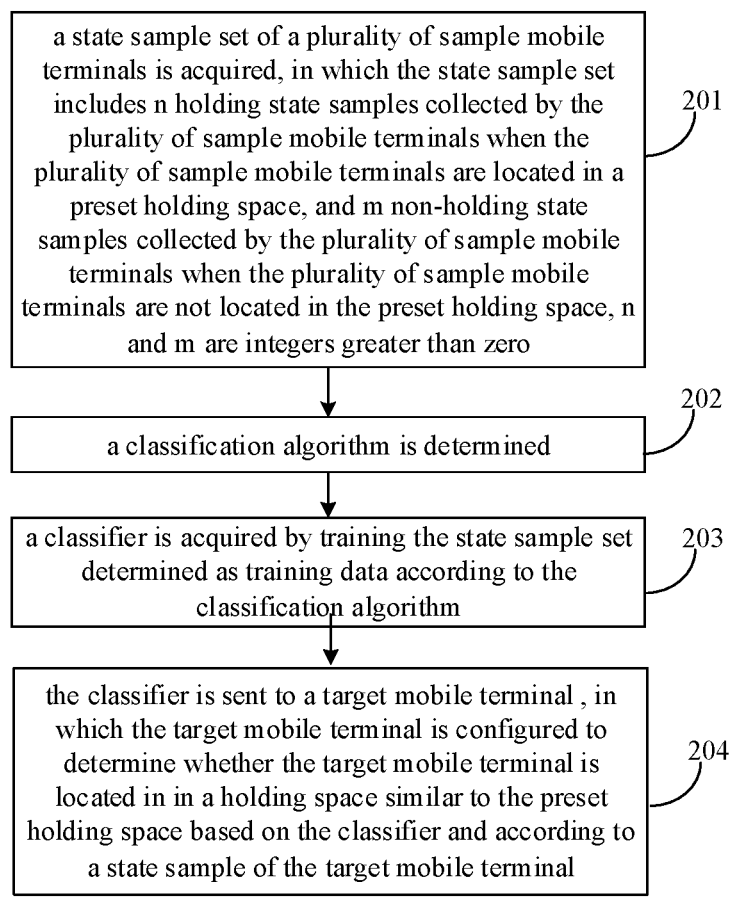
FIG. 2A is a flow chart illustrating a method for detecting a state according to an aspect of the present disclosure.

FIG. 2A is a flow chart illustrating a method for detecting a state according to an aspect of the present disclosure. This method is elaborated for detecting a state in the classifier generating device in implementation environment shown in FIG. 1. The method may include following acts.

At block 201, a state sample set of a plurality of sample mobile terminals is acquired, in which the state sample set includes n holding state samples collected by the plurality of sample mobile terminals when the plurality of sample mobile terminals are located in a preset holding space, and m non-holding state samples collected by the plurality of sample mobile terminals when the plurality of sample mobile terminals are not located in the preset holding space, where n and m are integers greater than zero.

At block 202, a classification algorithm is determined.

At block 203, a classifier is acquired by training the state sample set determined as training data according to the classification algorithm.

At block 204, the classifier is sent to a target mobile terminal to be detected, in which the target mobile terminal to be detected is configured to determine whether the target mobile terminal to be detected is located in a holding space similar to the preset holding space based on the classifier and according to a target state sample of the target mobile terminal to be detected. For example, the target mobile terminal may acquire the target state sample including at least three feature parameters from following parameters: a proximity distance from a distance sensor, a parameter from an acceleration sensor, a system time from a system clock, an ambient light from a light sensor, a program running on the target mobile terminal, and a screen displaying interface of the target mobile terminal. Using the target state sample and the classifier, the target mobile terminal may determine whether the target mobile terminal is placed in a partially enclosed container or bag. Accordingly, the target mobile terminal may enter an energy saving mode by disabling one or more sensors in the target mobile terminal when determining that the target mobile terminal is placed in the partially enclosed holding space.

In conclusion, with the method for detecting a state provided by embodiments of the present disclosure, by acquiring a state sample set of a plurality of sample mobile terminals, acquiring a classifier by setting the state sample set as training data and performing a training according to the classification algorithm, and sending the classifier to a mobile terminal to be detected, the mobile terminal to be detected may be able to determine whether it is located in a preset holding space according to the classifier considering various factors. Therefore, a problem of low accuracy of the method for determining whether a mobile terminal is in a pocket according to individual features in some specific scenes in the related arts may be resolved, such that a state detecting method having high accuracy may be achieved.

Figure 2B:
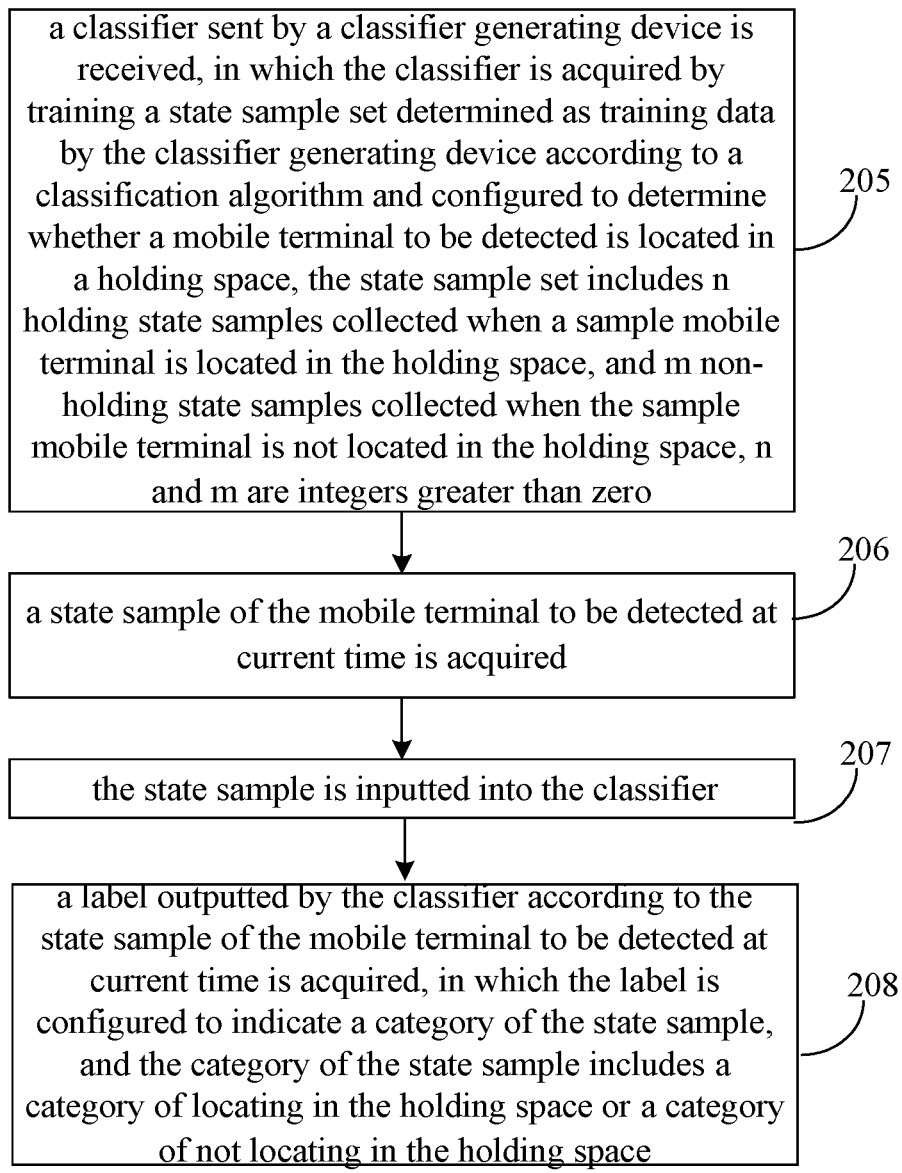
FIG. 2B is a flow chart illustrating a method for detecting a state according to another aspect of the present disclosure.

FIG. 2B is a flow chart illustrating a method for detecting a state according to an aspect of the present disclosure. This aspect is elaborated by applying the method for detecting a state in the mobile terminal to be detected in implementation environment shown in FIG. 1. The method for detecting a state includes followings.

At block 205, a classifier sent by a classifier generating device is received, in which the classifier is acquired by training a state sample set determined as training data by the classifier generating device according to a classification algorithm and is configured to determine whether a mobile terminal to be detected is located in a holding space, the state sample set includes n holding state samples collected when a sample mobile terminal is located in the holding space, and m non-holding state samples collected when the sample mobile terminal is not located in the holding space, where n and m are integers greater than zero.

At block 206, a state sample of the mobile terminal to be detected at current time is acquired.

At block 207, the state sample is inputted into the classifier.

At block 208, a label outputted by the classifier according to the state sample of the mobile terminal to be detected at current time is acquired, in which the label is configured to indicate a category of the state sample, and the category of the state sample includes a category of locating in the holding space or a category of not locating in the holding space. The category of locating in the holding space indicates that the mobile terminal to be detected collecting the state sample is located in the holding space. The category of not locating in the holding space indicates that the mobile terminal to be detected collecting the state sample is not located in the holding space.

In conclusion, with the method for detecting a state provided by embodiments of the present disclosure, by inputting a state sample of the mobile terminal to be detected at current time into the classifier generated according to a classification algorithm and a state sample set, it is determined whether the mobile terminal to be detected is located in a pocket at current time according to the classifier considering various factors. Therefore, a problem of low accuracy of the method for determining whether a mobile terminal is in a pocket according to individual features in some specific scenes in the related arts may be resolved, such that a state detecting method having high accuracy may be achieved.

Figure 3A:
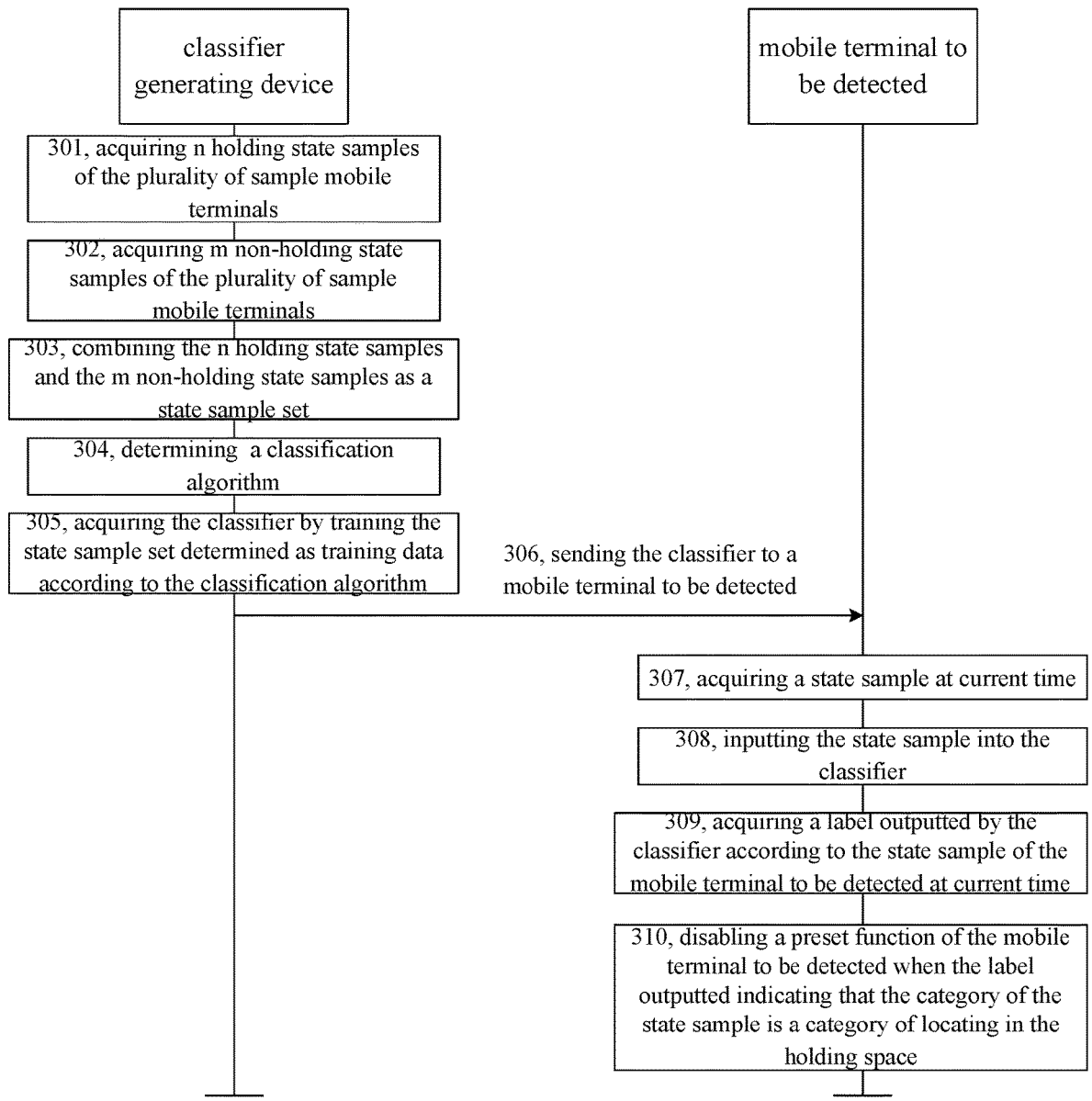
FIG. 3A is a flow chart illustrating a method for detecting a state according to yet another aspect of the present disclosure.

A flow chart of another method for detecting a state provided by an aspect of the present disclosure may be shown in FIG. 3A. This aspect is elaborated by applying the method for detecting a state in a mobile terminal to be detected. The method for detecting a state includes followings.

At block 301, a classifier generating device acquires n holding state samples of the plurality of sample mobile terminals.

The holding state sample is a state sample collected by the sample mobile terminal when the sample mobile terminal is located in a holding space. In embodiments of the present disclosure, the holding space may be a pocket, a backpack or a saddlebag and the like taken by the user. The classifier may acquire the n holding state samples when the plurality of sample mobile terminals are located in the holding space.

Figure 3B:
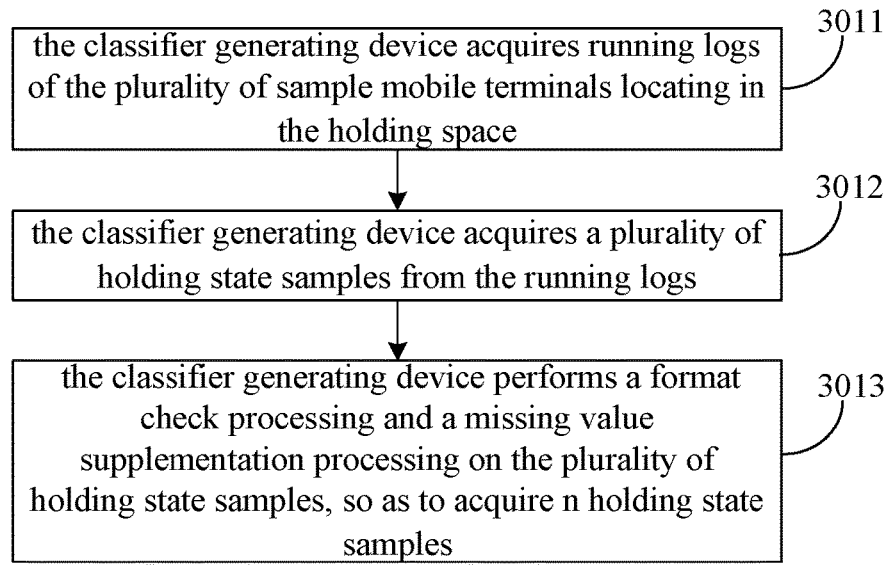
FIG. 3B is a flow chart of a method for acquiring a holding state sample according to an aspect shown in FIG. 2A.

As shown in FIG. 3B, the act at block 301 may include three sub-acts described as follows.

At block 3011, the classifier generating device acquires running logs of the plurality of sample mobile terminals locating in the holding space.

Here, the running logs may include various information and records when the sample mobile terminal is running. For example, the running logs in a time period during which the sample mobile terminal is in the pocket may be acquired.

At block 3012, the classifier generating device acquires a plurality of holding state samples from the running logs.

A holding state sample of the plurality of holding state samples may include p feature parameters and a label for indicating a category of the holding state sample, the category of the holding state sample is the category of locating in the holding space, where p is an integer greater than zero.

The p feature parameters may include at least three parameters from the following: a parameter acquired by a distance sensor, a parameter acquired by an acceleration sensor, a system time of the sample mobile terminal, a parameter acquired by a light sensor, a program running on the sample mobile terminal, and a screen displaying interface of the sample mobile terminal. The greater the value of p is, the higher the accuracy of the generated classifier is, but the lower the speed of generating the classifier is.

In the p feature parameters, the parameter acquired by the distance sensor is configured to reflect whether there are objects blocking around the sample mobile terminal. When there is an object blocking around the sample mobile terminal, the possibility that the sample mobile terminal is located in the holding space is high. The parameter acquired by the acceleration sensor is configured to reflect the acceleration of the sample mobile terminal. When the acceleration of the sample mobile terminal is zero continuously, the possibility that the sample mobile terminal is located in the holding space is high. The parameter acquired by the light sensor is configured to reflect an ambient light intensity around the sample mobile terminal. When the ambient light intensity around the sample mobile terminal is low, the possibility that the sample mobile terminal is located in the holding space is high. The system time of the sample mobile terminal is configured to assist and calibrate abnormities (for example, there are some objects blocking around the sample mobile terminal and the light intensity around the sample mobile terminal is low, but the sample mobile terminal is not located in the holding space) occurred occasionally of the parameter acquired by the distance sensor and the parameter acquired by the light sensor. The program running on the sample mobile terminal and a screen displaying interface of the sample mobile terminal are configured to reflect current behavior of the user. For example, when a game program runs on the sample mobile terminal and the screen displaying interface is a game interface of the game program, the possibility that the sample mobile terminal is located in the holding space is low. In addition, the p feature parameters may also include other feature parameters of the sample mobile terminal, which will not be limited in embodiments of the present disclosure.

At bock 3012, the classifier generating device may acquire a plurality of holding state samples from the running logs according to a pre-determined category of the feature parameter to be acquired. The plurality of holding state samples may be acquired from the running logs at different time. The greater the number of the holding state samples is, the higher the accuracy of the generated classifier is, but the lower the speed of generating the classifier is.

In embodiments of the present disclosure, categories (such as a category of mobile phones, a category of tablets and a category of smart watches and the like) or model numbers of the plurality of sample mobile terminals may be the same. Each sample mobile terminal is configured to collect the holding state sample and non-holding state sample. The greater the number of the sample mobile terminals is, the higher the speed of generating the state sample set is, and the higher the speed of generating the classifier is.

At block 3013, the classifier generating device performs a format check processing and a missing value supplementation processing on the plurality of holding state samples, so as to acquire n holding state samples.

At this block, following acts may be included. 1. The format check processing is performed on the plurality of holding state samples.

The format check processing is used to check a format of each holding state sample, so as to determine whether the format of each holding state sample is correct, and to delete the holding state sample with incorrect format. The format may be pre-determined and configured to transmit and record the holding state sample. There may be various reasons leading to the incorrect format of the holding state sample. An incorrect format of the holding state sample may be caused by some unknown bugs in the systems of the classifier generating device and the sample mobile terminal, or by an error of the transmitting path through which the sample mobile terminal transmits the holding state sample to the classifier generating device.

As the format check processing may delete the holding state sample of which the format is incorrect, the number n of the acquired holding state samples may not be a constant value and may change based on the format check processing.

2. The missing value supplementation processing is performed on the format-checked holding state sample.

The missing value supplementation processing is used to supplement some missing parameters or data in the holding state sample. These parameters and data may be some feature parameters in the holding state sample. When supplementing the missing values, a mean value of the feature parameters in the same category with the missing feature parameter in the plurality of holding state samples may be regarded as the supplemented value, and a preset value may also be used to supplement the missing feature parameter. The method for supplementing the missing value may refer to the related arts, which will not be described in detail herein. There may also be various reasons leading to a situation of some values missing from the holding state sample. The situation of some values missing from the holding state sample may be caused by some unknown bugs in the systems of the classifier generating device and the sample mobile terminal, or by an error of the transmitting path through which the sample mobile terminal transmits the holding state sample to the classifier generating device, or by some unexpected interruption when the sample mobile terminal acquires the holding state sample.

At block 302, the classifier generating device acquires m non-holding state samples of the plurality of sample mobile terminals.

Figure 3C:
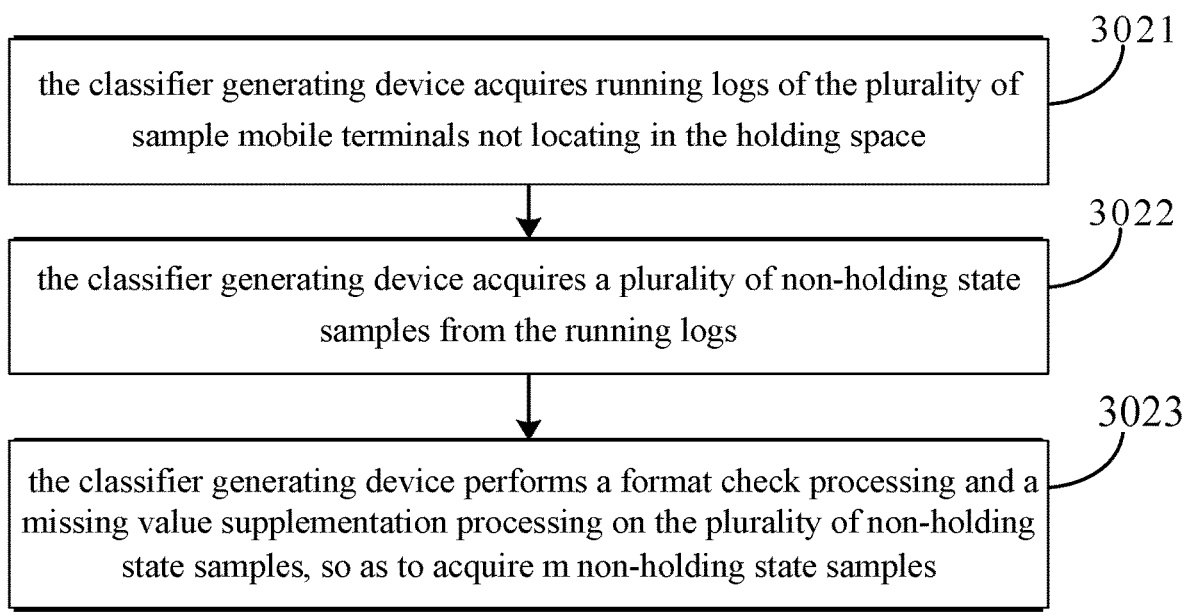
FIG. 3C is a flow chart of a method for acquiring a non-holding state sample according to an aspect shown in FIG. 2A.

As shown in FIG. 3C, the act at block 302 may include three sub-acts described as follows.

At block 3021, the classifier generating device acquires running logs of the plurality of sample mobile terminals not locating in the holding space.

Generally, the running logs may include various information and records when the sample mobile terminal is running. Exemplarily, the running logs in a time period during which the sample mobile terminal is not in the pocket may be acquired.

At block 3022, the classifier generating device acquires a plurality of non-holding state samples from the running logs.

Alternatively, a non-holding state sample of the plurality of non-holding state samples may include p feature parameters and a label for indicating a category of the non-holding state sample, the category of the non-holding state sample is the category of not locating in the holding space. The p feature parameters are the same as those in the holding state sample acquired at block 301.

At block 3023, the classifier generating device performs a format check processing and a missing value supplementation processing on the plurality of non-holding state samples, so as to acquire m non-holding state samples.

This block refers to block 3013 in block 301, which will not be described in detail herein.

The act in block 302 may be performed before or at the same time with that in block 301, which will not be limited in embodiments of the present disclosure.

At block 303, the classifier generating device combines the n holding state samples and the m non-holding state samples as a state sample set.

The n holding state samples may be regarded as positive samples in the state sample set and the m non-holding state samples may be regarded as negative samples in the state sample set, in which the positive samples may refer to samples belonging to a certain category, and the negative samples may refer to samples not belonging to the certain category. In embodiments of the present disclosure, the certain category is the category of locating in the holding space.

At block 304, the classifier generating device determines a classification algorithm.

The classification algorithm is one of a decision tree algorithm, a logistic regression algorithm and a support vector machine algorithm. The classifier generating device may determine the classification algorithm according to the state sample set.

In addition, the classification algorithm may be preset in the classifier generating device. The classifier generating device may determine the preset classification algorithm as the classification algorithm used to generate a classifier.

At block 305, the classifier generating device acquires the classifier by training the state sample set determined as training data according to the classification algorithm.

After the classification algorithm and the state sample set are determined, the classifier generating device may acquire the classifier by training the state sample set determined as training data according to the classification algorithm. In embodiments of the present disclosure, the process of acquiring the classifier by training the state sample having the label is a supervised learning process in a machine learning process.

In a process of training by the classifier generating device to acquire the classifier, iterative computations may be performed on the training data in the state sample set with the classification algorithm, such that respective parameters of the classifier may be adjusted gradually, and the performance of the classifier may reach to a preset requirement gradually. Exemplarily, respective parameters of the classifier may be adjusted gradually to make the accuracy of the classifier greater than 80%.

In addition, the classifier generating device may train each category of feature parameters in the state sample set respectively. The training method may refer to the related arts, which will not be described herein.

At block 306, the classifier generating device sends the classifier to a mobile terminal to be detected.

Figure 3D:
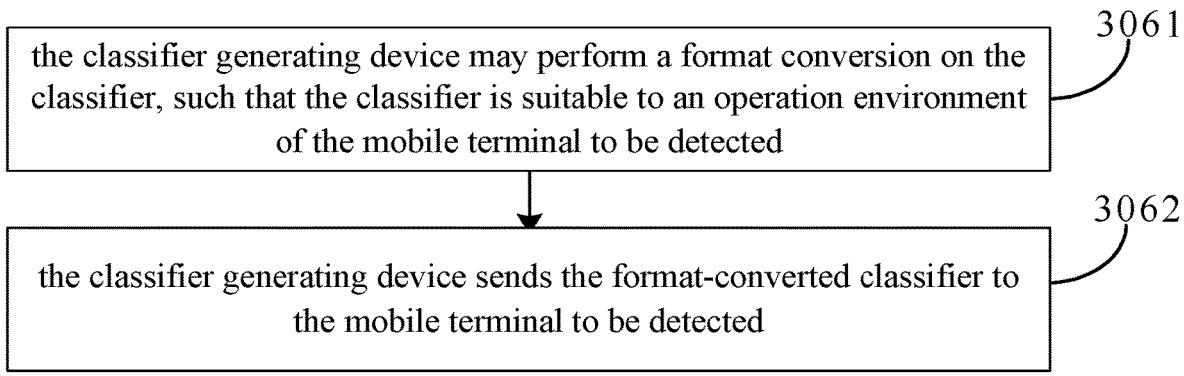
FIG. 3D is a flow chart of a method for sending a classifier according to an aspect shown in FIG. 2A.

As shown in FIG. 3D, the act at block 306 may include two sub-acts described as follows.

At block 3061, the classifier generating device may perform a format conversion on the classifier, such that the classifier is suitable to an operation environment of the mobile terminal to be detected.

Generally, the classifier generating device is a computer operation environment, a frame structure of the computer operation environment is in a format of spark (cluster computing environment applied to a server), while a frame structure of a mobile terminal is in a format of predictive model markup language (pmml for short).

It may be difficult for the classifier generated in the frame structure in the spark format to be applied to the frame structure in the pmml format. Therefore, the classifier generating device may convert a binary file of the classifier in the spark format into a pmml file of the classifier in the pmml format using a pmml converting method or jpmml (Java-based pmml application program interface)-sparkml (Spark-based machine learning) converting method, such that the classifier is able to be applied to the operation environment of the mobile terminal.

At block 3062, the classifier generating device sends the format-converted classifier to the mobile terminal to be detected.

The classifier generating device may send the format-converted classifier to the mobile terminal to be detected via a wired or wireless connection.

Acts in blocks 301-306 are alternatives. In other words, if there is a classifier in the mobile terminal to be detected, act in block 307 may be performed directly.

At block 307, the mobile terminal to be detected acquires a state sample at current time.

After the classifier is acquired, the mobile terminal to be detected may acquire the state sample at current time according to the classifier. This state sample has no label, i.e., this state sample only has a plurality of feature parameters, and the categories of the plurality of feature parameters are the same as those of the feature parameters of any holding state sample acquired at block 301 (or, of any non-holding state sample acquired at block 302). Exemplarily, if any holding state sample acquired at block 301 may include feature parameters "a parameter acquired by a distance sensor, a parameter acquired by an acceleration sensor, and a system time of the sample mobile terminal", the state sample at current time acquired by the mobile terminal to be detected includes the parameter acquired by the distance sensor at current time, the parameter acquired by the acceleration sensor at current time, and the system time at current time.

At block 308, the mobile terminal to be detected inputs the state sample into the classifier.

After the state sample at current time is acquired, the mobile terminal to be detected may input the state sample into the classifier.

At block 309, the mobile terminal to be detected acquires a label outputted by the classifier according to the state sample of the mobile terminal to be detected at current time.

The label acquired by the mobile terminal to be detected is used to indicate a category of the state sample, and the category is a state of the mobile terminal to be detected, i.e., locating or not locating in the holding space.

At block 310, the mobile terminal to be detected disables a preset function of the mobile terminal to be detected when the label outputted indicating that the category of the state sample is the category of locating in the holding space.

When the label outputted indicating that the category of the state sample is the category of locating in the holding space, it is indicated that the mobile terminal to be detected may be located in the holding space. In this case, the preset function of the mobile terminal to be detected may be disabled to reduce power consumption and unintended activations. The preset function may include at least one of a screen-on notification function, a function for switching on a screen through a gesture, a fingerprint unlocking function and a function for starting a camera by double-clicking a button. Alternatively, the mobile terminal to be detected may enter a dormant mode when the label outputted indicating that the category of the state sample is the category of locating in the holding space. In this mode, the operating manner of the mobile terminal to be detected may refer to the operating manner of the mobile terminal in a dormant mode in related arts, which will not be described herein.

In addition, the mobile terminal to be detected may enable a preset function of the mobile terminal to be detected when the label outputted indicating that the category of the state sample is the category of not locating in the holding space. The mobile terminal to be detected may determine whether the mobile terminal to be detected is in the holding space by performing acts in blocks 307-310 continually. Therefore, after the user takes out the mobile terminal to be detected from the holding space, the mobile terminal to be detected may immediately determine that the mobile terminal to be detected is not in the holding space (and activate the preset function). When the user brightens the screen of the mobile terminal to be detected via a button or a gesture, the mobile terminal to be detected may switch the screen on quickly, without determining whether the mobile terminal to be detected is in the holding space according to the parameters of respective components when the user brightens the screen of the mobile terminal to be detected via a button or a gesture.

In embodiments of the present disclosure, the classifier may be sent to the mobile terminal to be detected, and the mobile terminal to be detected may determine whether the mobile terminal to be detected is in the holding space through the classifier, such that a problem that the mobile terminal to be detected is unable to determine whether the mobile terminal to be detected is in the holding space due to a network failure when the classifier is located in other external devices may be avoided.

In conclusion, with the method for detecting a state, by acquiring a state sample set of a plurality of sample mobile terminals, acquiring a classifier by training the state sample set determined as training data according to the classification algorithm, and sending the classifier to a mobile terminal to be detected, the mobile terminal to be detected may be able to determine whether it is located in a preset holding space according to the classifier considering various factors.

Therefore, a problem of low accuracy of the method for determining whether a mobile terminal is in a pocket according to individual features in some specific scenes in the related arts may be resolved, such that a state detecting method having high accuracy may be achieved.

Apparatus embodiments of the present disclosure will be described as follows and applied to perform the method embodiments of the present disclosure. Regarding details which are not disclosed in the apparatus embodiments of the present disclosure, reference may be made to the method embodiments of the present disclosure.

Figure 4:
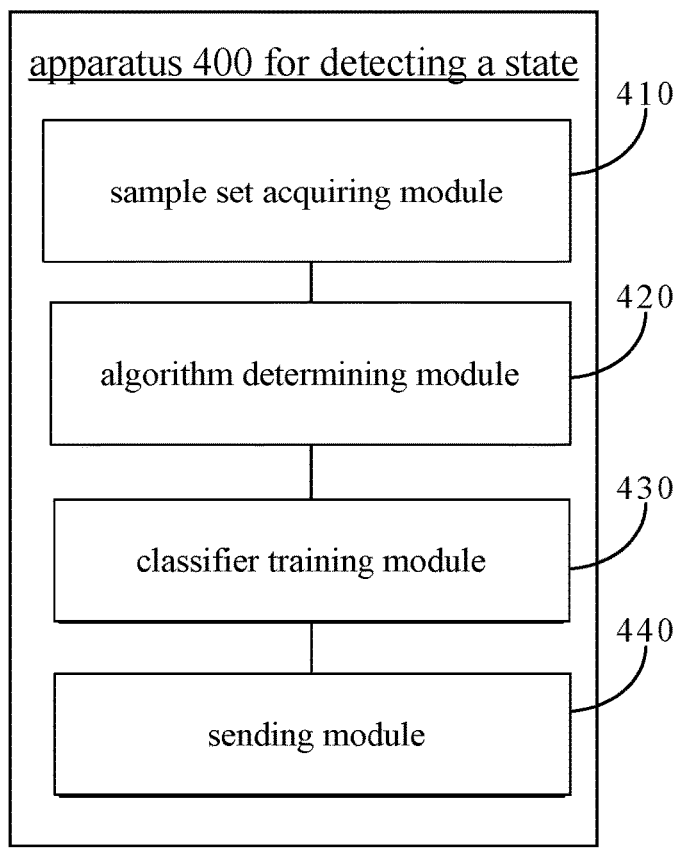
FIG. 4 is a block diagram of an apparatus for detecting a state provided by an aspect of the present disclosure.

FIG. 4 is a block diagram of an apparatus for detecting a state provided by an aspect of the present disclosure. The apparatus may be applied to the classifier generating device in the implementing environment shown in FIG. 1. The apparatus 400 may include: a sample set acquiring module 410, an algorithm determining module 420, a classifier training module 430 and a sending module 440.

The sample set acquiring module 410 is configured to acquire a state sample set of a plurality of sample mobile terminals, in which the state sample set includes n holding state samples collected by the plurality of sample mobile terminals when the plurality of sample mobile terminals are located in a preset holding space, and m non-holding state samples collected by the plurality of sample mobile terminals when the plurality of sample mobile terminals are not located in the preset holding space, where n and m are integers greater than zero.

The algorithm determining module 420 is configured to determine a classification algorithm.

The classifier training module 430 is configured to acquire a classifier by training the state sample set determined as training data according to the classification algorithm.

The sending module 440 is configured to send the classifier to a mobile terminal to be detected, in which the mobile terminal to be detected is configured to determine whether the mobile terminal to be detected is located in in a holding space similar to the preset holding space based on the classifier and according to a state sample of the mobile terminal to be detected.

In conclusion, with the apparatus for detecting a state, by acquiring a state sample set of a plurality of sample mobile terminals, acquiring a classifier by training the state sample set determined as training data according to the classification algorithm, and sending the classifier to a mobile terminal to be detected, the mobile terminal to be detected may be able to determine whether it is located in a preset holding space according to the classifier considering various factors. Therefore, a problem of low accuracy of the method for determining whether a mobile terminal is in a pocket according to individual features in some specific scenes in the related arts may be resolved, such that a state detecting method having high accuracy may be achieved.

Alternatively or additionally, the sample set acquiring module 410 is configured to acquire a plurality of holding state samples collected by the plurality of sample mobile terminals when the plurality of sample mobile terminals are located in the preset holding space; to acquire a plurality of non-holding state samples collected by the plurality of sample mobile terminals when the plurality of sample mobile terminals are not located in the preset holding space; and to perform a format check processing and a missing value supplementation processing on the plurality of holding state samples and the plurality of non-holding state samples, so as to acquire the state sample set.

Alternatively or additionally, the sending module 440 is configured to perform a format conversion on the classifier, to enable the classifier to be suitable to an operation environment of the mobile terminal to be detected; and to send the converted classifier to the mobile terminal to be detected.

Alternatively or additionally, the classification algorithm is one of a decision tree algorithm, a logistic regression algorithm and a support vector machine algorithm.

Alternatively or additionally, a holding state sample of the n holding state samples includes p feature parameters and a label for indicating a category of the holding state sample, the category of the holding state sample is a category of locating in the preset holding space, and p is an integer greater than zero.

Alternatively or additionally, a non-holding state sample of the m non-holding state samples includes p feature parameters and a label for indicating a category of the non-holding state sample, the category of the non-holding state sample is a category of not locating in the preset holding space.

Alternatively or additionally, the p feature parameters include at least three of a parameter acquired by a distance sensor, a parameter acquired by an acceleration sensor, a system time of the sample mobile terminal, a parameter acquired by a light sensor, a program running on the sample mobile terminal and a screen displaying interface of the sample mobile terminal.

In this disclosure, the preset holding space may be a partially enclosed space, which may include a pocket, a backpack, a wallet, a holder, or a saddlebag taken by a user.

In conclusion, with the apparatus for detecting a state, by acquiring a state sample set of a plurality of sample mobile terminals, acquiring a classifier by training the state sample set determined as training data according to the classification algorithm, and sending the classifier to a mobile terminal to be detected, the mobile terminal to be detected may be able to determine whether it is located in a preset holding space according to the classifier considering various factors. Therefore, a problem of low accuracy of the method for determining whether a mobile terminal is in a pocket according to individual features in some specific scenes in the related arts may be resolved, such that a state detecting method having high accuracy may be achieved.

Figure 5A:
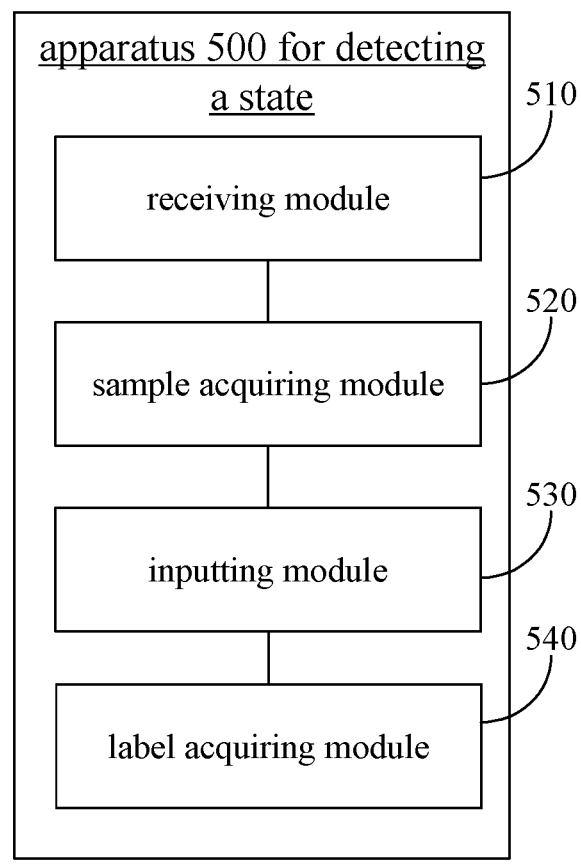
FIG. 5A is a block diagram of an apparatus for detecting a state provided by an aspect of the present disclosure.

FIG. 5A is a block diagram of an apparatus for detecting a state provided by an aspect of the present disclosure. The apparatus may be applied to the mobile terminal to be detected in the implementing environment shown in FIG. 1. The apparatus 500 may include: a receiver 510, a sample acquiring module 520, an inputting module 530 and a label acquiring module 540.

The receiver 510 is configured to receive a classifier sent by a classifier generating device, in which the classifier is acquired by training a state sample set determined as training data by the classifier generating device according to a classification algorithm and is configured to determine whether a mobile terminal to be detected is located in a holding space, the state sample set includes n holding state samples collected when a sample mobile terminal is located in the holding space, and m non-holding state samples collected when the sample mobile terminal is not located in the holding space, where n and m are integers greater than zero.

The sample acquiring module 520 is configured to acquire a state sample of the mobile terminal to be detected at current time.

The inputting module 530 is configured to input the state sample into the classifier.

The label acquiring module 540 is configured to acquire a label outputted by the classifier according to the state sample of the mobile terminal to be detected at current time, in which the label is configured to indicate a category of the state sample, and the category of the state sample is one of a category of locating in the holding space and a category of not locating in the holding space.

Figure 5B:
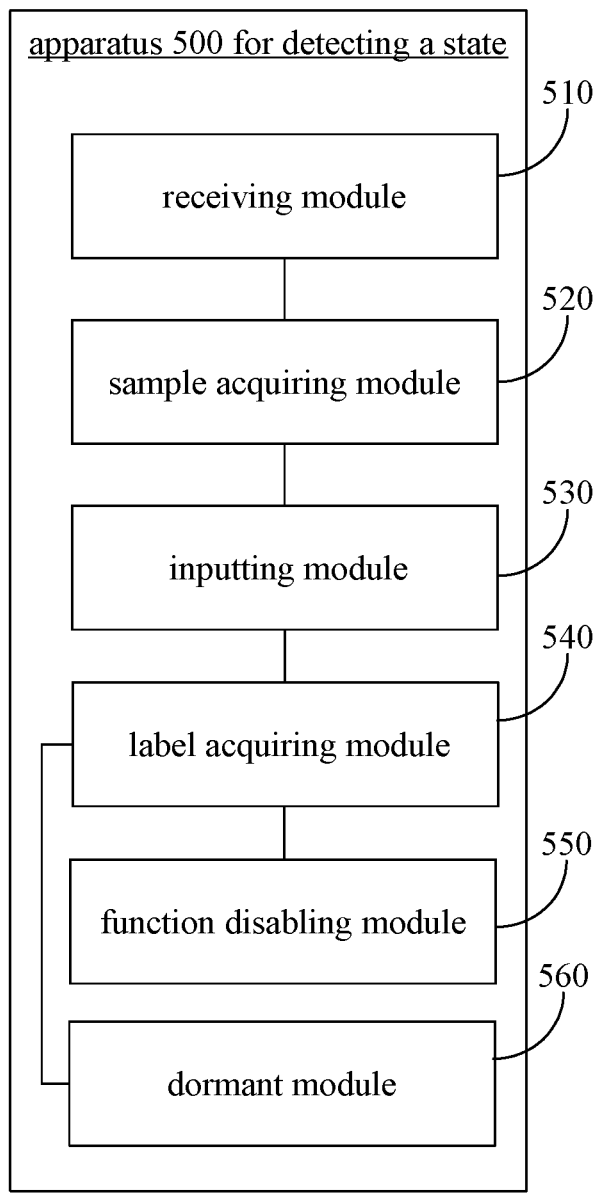
FIG. 5B is a block diagram of an apparatus for detecting a state provided by another aspect of the present disclosure.

Alternatively, as shown in FIG. 5B, a block diagram of an apparatus for detecting a state provided by another embodiment of the present disclosure is illustrated. The apparatus 500 for detecting a state also includes: a function disabling module 550 and a dormant module 560.

The function disabling module 550 is configured to disable a preset function of the mobile terminal to be detected when the label indicating that the category of the state sample is the category of locating in the holding space.

The dormant module 560 is configured to control the mobile terminal to be detected to enter a dormant state when the label indicating that the category of the state sample is the category of locating in the holding space.

Alternatively, the preset function includes at least one of a screen-on notification function, a function for switching on a screen through a gesture, a fingerprint unlocking function and a function for starting a camera by double-clicking a button.

In conclusion, with the apparatus for detecting a state provided by embodiments of the present disclosure, by inputting a state sample of the mobile terminal to be detected at current time into the classifier generated according to a classification algorithm and a state sample set, it is determined whether the mobile terminal to be detected is located in a pocket at current time according to the classifier considering various factors. Therefore, a problem of low accuracy of the method for determining whether a mobile terminal is in a pocket according to individual features in some specific scenes in the related arts may be resolved, such that a state detecting method having high accuracy may be achieved.

Figure 6:
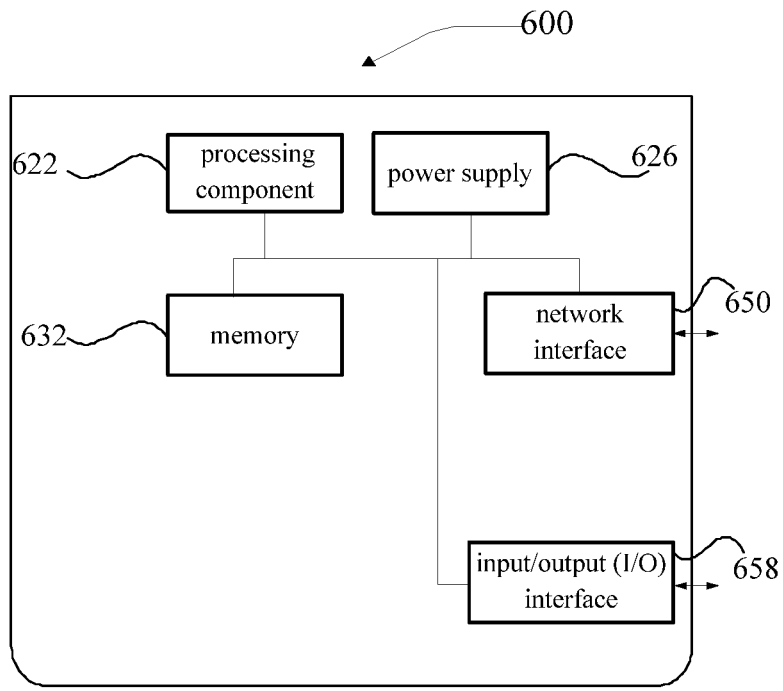
FIG. 6 is a block diagram illustrating a device for detecting a state according to an example of the present disclosure.

FIG. 6 is a block diagram illustrating a device 600 for detecting a state according to an example of the present disclosure. For example, the device 600 may be provided as a computer. Referring to FIG. 6, the device 600 may include a processing component 622 which further including one or more processors, and a memory resource represented by a memory 632 for storing instructions executed by the processing component 622, such as an application program. The application programs stored in the memory 632 may include one or more modules, each module may correspond to a series of instructions. Furthermore, the processing component 622 may be configured to execute the series of instructions, so as to execute the method for detecting a state.

The device 600 may further include a power supplies 626 configured to perform a power management for the device 600, a wired or wireless network interfaces 650 configured to connect the device 600 to a network, and an input/output (I/O) interfaces 658. The device 600 may be operated based on an operating system stored in the memory 632, such as Windows Server™, Mac OS X™, Unix™, Linux™, FreeBSD™ and so on.

Figure 7:
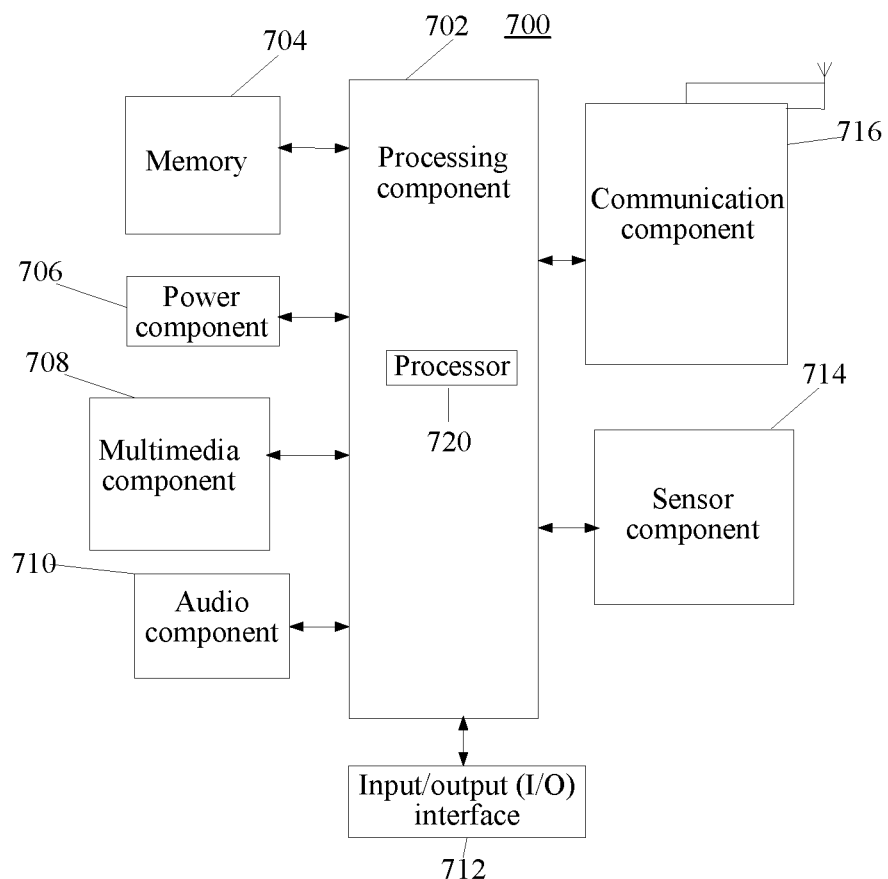
FIG. 7 is a block diagram illustrating a device for detecting a state according to an example of the present disclosure.

FIG. 7 is a block diagram illustrating a device 700 for detecting a state according to an example of the present disclosure. The device 700 for detecting a state may be provided as a mobile terminal. Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of device for detecting a state, causes the device for detecting a state to perform a method for detecting a state. The method includes: acquiring a state sample set of a plurality of sample mobile terminals, in which the state sample set includes n holding state samples collected by the plurality of sample mobile terminals when the plurality of sample mobile terminals are located in a preset holding space, and m non-holding state samples collected by the plurality of sample mobile terminals when the plurality of sample mobile terminals are not located in the preset holding space, where n and m are integers greater than zero; determining a classification algorithm; acquiring a classifier by training the state sample set determined as training data according to the classification algorithm; and sending the classifier to a mobile terminal to be detected, in which the mobile terminal to be detected is configured to determine whether the mobile terminal to be detected is located in the preset holding space based on the classifier and according to a state sample of the mobile terminal to be detected.

Alternatively, acquiring the state sample set of the plurality of sample mobile terminals includes: acquiring a plurality of holding state samples collected by the plurality of sample mobile terminals when the plurality of sample mobile terminals are located in the preset holding space; acquiring a plurality of non-holding state samples collected by the plurality of sample mobile terminals when the plurality of sample mobile terminals are not located in the preset holding space; and performing a format check processing and a missing value supplementation processing on the plurality of holding state samples and the plurality of non-holding state samples, so as to acquire the state sample set.

Alternatively, sending the classifier to the mobile terminal to be detected includes: performing a format conversion on the classifier, to enable the classifier to be suitable to an operation environment of the mobile terminal to be detected; and sending the converted classifier to the mobile terminal to be detected.

Alternatively, the classification algorithm is one of a decision tree algorithm, a logistic regression algorithm and a support vector machine algorithm.

Alternatively, a holding state sample of the n holding state samples includes p feature parameters and a label for indicating a category of the holding state sample, the category of the holding state sample is a category of locating in the preset holding space, and p is an integer greater than zero.

Alternatively, a non-holding state sample of the m non-holding state samples includes p feature parameters and a label for indicating a category of the non-holding state sample, the category of the non-holding state sample is a category of not locating in the preset holding space.

Alternatively, the p feature parameters include at least three of a parameter acquired by a distance sensor, a parameter acquired by an acceleration sensor, a system time of the sample mobile terminal, a parameter acquired by a light sensor, a program running on the sample mobile terminal and a screen displaying interface of the sample mobile terminal.

Alternatively, the preset holding space includes a pocket, a backpack or a saddlebag taken by a user.

A non-transitory computer-readable storage medium has stored therein instructions that, when executed by a processor of device for detecting a state, causes the device for detecting a state to perform a method for detecting a state. The method includes: receiving a classifier sent by a classifier generating device, in which the classifier is acquired by training a state sample set determined as training data by the classifier generating device according to a classification algorithm and is configured to determine whether a mobile terminal to be detected is located in a holding space, the state sample set includes n holding state samples collected when a sample mobile terminal is located in the holding space, and m non-holding state samples collected when the sample mobile terminal is not located in the holding space, where n and m are integers greater than zero; acquiring a state sample of the mobile terminal to be detected at current time; inputting the state sample into the classifier; and acquiring a label outputted by the classifier according to the state sample of the mobile terminal to be detected at current time, in which the label is configured to indicate a category of the state sample, and the category of the state sample is one of a category of locating in the holding space and a category of not locating in the holding space.

Alternatively, the method also includes: disabling a preset function of the mobile terminal to be detected when the label indicating that the category of the state sample is the category of locating in the holding space; or controlling the mobile terminal to be detected to enter a dormant state when the label indicating that the category of the state sample is the category of locating in the holding space.

Alternatively, the preset function includes at least one of a screen-on notification function, a function for switching on a screen through a gesture, a fingerprint unlocking function and a function for starting a camera by double-clicking a button.

In the present disclosure, the term "at least one of A and B" is merely an association relation between association objects and includes three possible relations. For example, at least one of A and B may include three situations: A, A+B, and B. Similarly, "at least one of A, B and C" may include seven situations, including: A, B, C, A+B, A+C, B+C, and A+B+C. Similarly, "at least one of A, B, C and D" may include fifteen situations, including: A, B, C, D, A+B, A+C, A+D, B+C, B+D, C+D, A+B+C, A+B+D, A+C+D, B+C+D and A+B+C+D.

In the embodiments provided by the present disclosure, it should be understood that the disclosed apparatus and method may be implemented in other manner. For example, the above-described apparatus embodiments are merely exemplary, the module division is merely a logical function division. In the practical application, there may be other division methods. For example, more than one modules or components may be combined or integrated into another system, some features may be omitted or non-executed. In addition, described or discussed interacted or direct coupling, or communicating connection may be established via some interfaces. An indirect coupling or communicating connection between devices or modules may be an electrical connection, a mechanical connection or in other forms.

Modules described as separate components may be or may not be physically separated, components displayed as modules may be or may not be a physical module. In other words, the components may at one location, or may be distributed on a number of network modules. A part or all of the modules may be selected according to practical requirements to realize the solution of the embodiments. Further, each module may be implemented by one or more circuitries, which may include a processor, a DSP, or other type of hardware.

Those skilled in the art shall understand that all or parts of the steps in the above exemplifying method of the present disclosure may be achieved by hardware or commanding the related hardware with programs. The programs may be stored in a computer readable storage medium. The storage medium mentioned above may be read-only memories, magnetic disks, CD, etc.

The present disclosure has been described are merely the preferred embodiments without limiting the present disclosure. Various changes and modifications of the present disclosure may be made without departing from the spirit and scope of the present disclosure shall fall within the protection scope of the present invention.

What is claimed is:

1. A method for detecting a state of a target mobile terminal, comprising:
acquiring a state sample set of a plurality of sample mobile terminals, wherein the state sample set comprises a first plurality of holding state samples collected by the plurality of sample mobile terminals when the plurality of sample mobile terminals are located in a preset holding space, and a second plurality of non-holding state samples collected by the plurality of sample mobile terminals when the plurality of sample mobile terminals are not located in the preset holding space, and a missing value supplementation processing is performed on the first plurality of holding state samples and the second plurality of non-holding state samples by using a mean value of a number of feature parameters in a same category;
determining a classification algorithm;
acquiring a classifier by training the state sample set determined as training data according to the classification algorithm; and
sending the classifier to the target mobile terminal for detecting a target state of the target mobile terminal, wherein the target mobile terminal is configured to determine whether the target mobile terminal is located in a holding space similar to the preset holding space based on the classifier and according to a target state sample of the target mobile terminal, wherein sending the classifier to the target mobile terminal comprises:
performing a format conversion on the classifier, to enable the classifier to be suitable to an operation environment of the target mobile terminal, wherein performing the format conversion on the classifier comprises converting a binary file of the classifier in a spark format into a pmml file of the classifier in a pmml format; and
sending the converted classifier to the target mobile terminal.

2. The method according to claim 1, wherein acquiring the state sample set of the plurality of sample mobile terminals comprises:
acquiring a plurality of holding state samples collected by the plurality of sample mobile terminals when the plurality of sample mobile terminals are located in the preset holding space;
acquiring a plurality of non-holding state samples collected by the plurality of sample mobile terminals when the plurality of sample mobile terminals are not located in the preset holding space; and
performing a format check processing on the plurality of holding state samples and the plurality of non-holding state samples, so as to acquire the state sample set.

3. The method according to claim 1, wherein the classification algorithm is one of a decision tree algorithm, a logistic regression algorithm and a support vector machine algorithm.

4. The method according to claim 1, wherein a holding state sample of the first plurality of holding state samples comprises p feature parameters and a label for indicating a category of the holding state sample, the category of the holding state sample is a category of locating in the preset holding space, and p is an integer greater than zero.

5. The method according to claim 1, wherein a non-holding state sample of the second plurality of non-holding state samples comprises p feature parameters and a label for indicating a category of the non-holding state sample, and the category of the non-holding state sample is a category of not locating in the preset holding space.

6. The method according to claim 5, wherein, the p feature parameters comprise at least three of a parameter acquired by a distance sensor, a parameter acquired by an acceleration sensor, a system time of the sample mobile terminal, a parameter acquired by a light sensor, a program running on the sample mobile terminal and a screen displaying interface of the sample mobile terminal.

7. The method according to claim 1, wherein the preset holding space comprises a pocket, a backpack, or a saddlebag.

8. The method according to claim 1, further comprising:
acquiring the target state sample including at least three feature parameters from following parameters: a proximity distance from a distance sensor, a parameter from an acceleration sensor, a system time from a system clock, an ambient light from a light sensor, a program running on the target mobile terminal, and a screen displaying interface of the target mobile terminal.

9. A method for detecting a state, comprising:
receiving a classifier sent by a classifier generating device, wherein the classifier is acquired by training a state sample set determined as training data by the classifier generating device according to a classification algorithm and is configured to determine whether a mobile terminal to be detected is located in a holding space similar to a preset holding space, the state sample set comprises a first plurality of holding state samples collected when a sample mobile terminal is located in the preset holding space, and a second plurality of non-holding state samples collected when the sample mobile terminal is not located in the preset holding space, wherein a missing value supplementation processing is performed on the first plurality of holding state samples and the second plurality of non-holding state samples by using a mean value of a number of feature parameters in a same category, and a format conversion is performed on the classifier to enable the classifier to be suitable to an operation environment of a target mobile terminal, wherein the format conversion on the classifier comprises converting a binary file of the classifier in a spark format into a pmml file of the classifier in a pmml format;
acquiring a current state sample of the mobile terminal to be detected at a current time;
inputting the current state sample into the classifier; and
acquiring a label outputted by the classifier according to the current state sample of the mobile terminal to be detected at the current time, wherein the label is configured to indicate a category of the current state sample, and the category of the state sample is one of a category of locating in the holding space and a category of not locating in the holding space.

10. The method according to claim 9, further comprising:
disabling a preset function of the mobile terminal to be detected when the label indicating that the category of the state sample is the category of locating in the holding space; or
controlling the mobile terminal to be detected to enter a dormant state when the label indicating that the category of the state sample is the category of locating in the holding space.

11. The method according to claim 10, wherein the preset function comprises at least one of a screen-on notification function, a function for switching on a screen through a gesture, a fingerprint unlocking function and a function for starting a camera by double-clicking a button.

12. An apparatus for detecting a state of a target mobile terminal, comprising at least one processor configured to:
acquire a state sample set of a plurality of sample mobile terminals, wherein the state sample set comprises a first plurality of holding state samples collected by the plurality of sample mobile terminals when the plurality of sample mobile terminals are located in a preset holding space, and a second plurality of non-holding state samples collected by the plurality of sample mobile terminals when the plurality of sample mobile terminals are not located in the preset holding space, and a missing value supplementation processing is performed on the first plurality of holding state samples and the second plurality of non-holding state samples by using a mean value of a number of feature parameters in a same category;
determine a classification algorithm;
acquire a classifier by training the state sample set determined as training data according to the classification algorithm;
send the classifier to the target mobile terminal, in which the target mobile terminal is configured to determine whether the target mobile terminal is located in a holding space similar to the preset holding space based on the classifier and according to a state sample of the target mobile terminal;
perform a format conversion on the classifier, to enable the classifier to be suitable to an operation environment of the target mobile terminal, wherein performing the format conversion on the classifier comprises converting a binary file of the classifier in a spark format into a pmml file of the classifier in a pmml format; and
send the converted classifier to the target mobile terminal.

13. The apparatus according to claim 12, wherein the at least one processor is configured to:
acquire a plurality of holding state samples collected by the plurality of sample mobile terminals when the plurality of sample mobile terminals are located in the preset holding space;
acquire a plurality of non-holding state samples collected by the plurality of sample mobile terminals when the plurality of sample mobile terminals are not located in the preset holding space; and
perform a format check processing on the plurality of holding state samples and the plurality of non-holding state samples, so as to acquire the state sample set.

14. The apparatus according to claim 12, wherein the classification algorithm is one of a decision tree algorithm, a logistic regression algorithm and a support vector machine algorithm.

15. The apparatus according to claim 12, wherein a holding state sample of the first plurality of holding state samples comprises p feature parameters and a label for indicating a category of the holding state sample, the category of the holding state sample is a category of locating in the preset holding space, and p is an integer greater than zero.

16. The apparatus according to claim 12, wherein a non-holding state sample of the second plurality of non-holding state samples comprises p feature parameters and a label for indicating a category of the non-holding state sample, and the category of the non-holding state sample is a category of not locating in the preset holding space.

17. The apparatus according to claim 15, wherein, the p feature parameters comprise at least three of a parameter acquired by a distance sensor, a parameter acquired by an acceleration sensor, a system time of the sample mobile terminal, a parameter acquired by a light sensor, a program running on the sample mobile terminal and a screen displaying interface of the sample mobile terminal.

18. The apparatus according to claim 12, wherein the preset holding space comprises a pocket, a backpack, or a saddlebag.

\* \* \* \* \*